Figure 1:
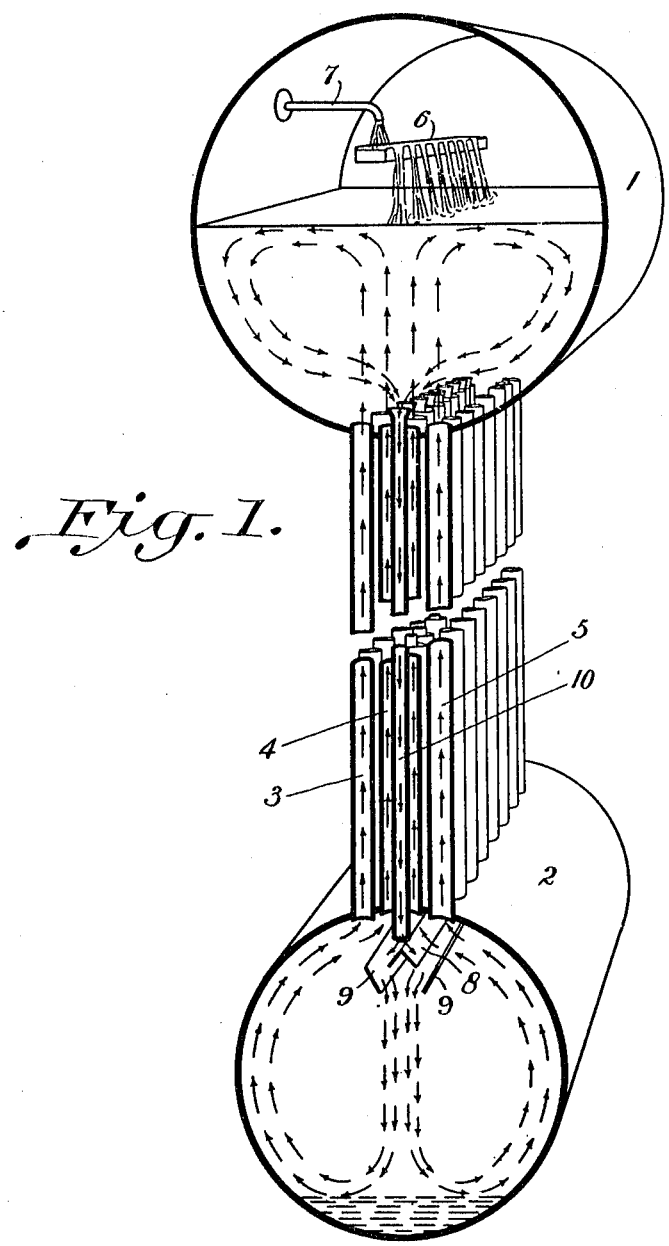

P. KESTNER.
STEAM BOILER.
APPLICATION FILED SEPT. 17, 1912.

1,270,621.

Patented June 25, 1918.
2 SHEETS—SHEET 1.

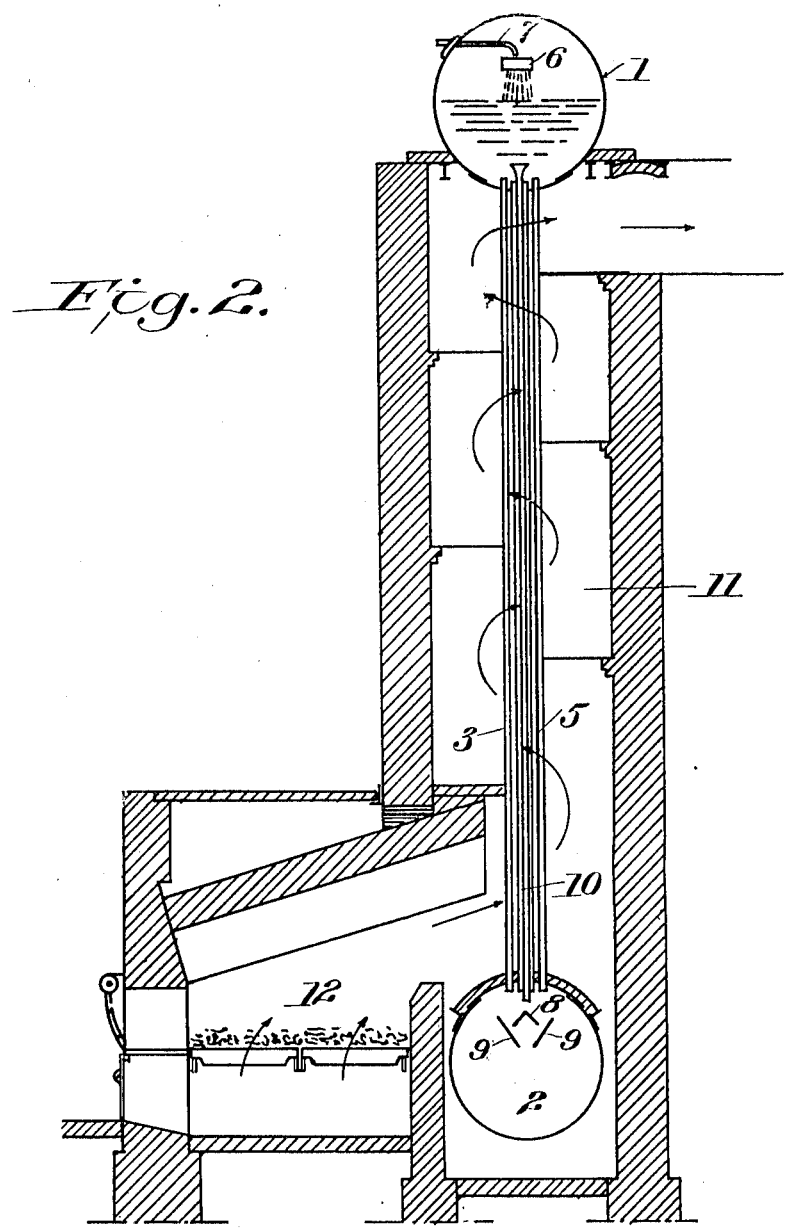

UNITED STATES PATENT OFFICE.

PAUL KESTNER, OF LILLE, FRANCE.

STEAM-BOILER.

1,270,621.  Specification of Letters Patent.  Patented June 25, 1918.

Application filed September 17, 1912. Serial No. 720,780.

*To all whom it may concern:*

Be it known that I, PAUL KESTNER, a citizen of the French Republic, residing at Lille, in the Nord Province of France, have invented new and useful Improvements in Steam-Boilers, of which the following is a specification.

This invention has reference to improvements in steam boilers of the type comprising superposed non-heated drums or cylinders connected by evaporation tubes and return tubes, the evaporation tubes constituting the heating surface, and the main object of my invention is to prevent incrustation, more particularly incrustation of the evaporation tubes—to which alone heat is applied, no heat being applied directly to the drums or cylinders.

It is well known that the incrusting matter usually contained in feed water is composed almost exclusively of bicarbonate of lime and sulfate of lime and, further, that when the water is heated to boiling point and above that, the bicarbonate is decomposed into carbonic acid and carbonate the latter being insoluble, and the sulfate which is precipitated also becomes practically insoluble when the water is so heated.

It follows therefore that when the water in the boiler has been heated to the usual fairly high temperatures, it should contain carbonate and sulfate of lime in suspension but practically no salts in solution.

It is also known that if pure water containing insoluble matter (such as carbonate or sulfate of lime) be passed through substantially vertical evaporation tubes no incrustation will take place provided the circulation be fairly active.

Notwithstanding this it is a fact that in practice such tubes do become incrusted although much care is exercised by many not only to insure the feed water being heated practically instantly on its being admitted into the boiler to substantially the high temperature of the water already therein but also to maintain a fairly active circulation through the evaporation and return tubes.

This incrustation of the evaporation surfaces or tubes is, I find, due to the fact that the decomposition of the bicarbonate into carbonic acid and carbonate and the precipitation of the sulfate are not instantaneous reactions. They are progressive and are only completed after a certain time. If, therefore, the water comes into contact with the evaporation surfaces or tubes before these reactions have been completed (which is the case with the boilers as heretofore constructed and used) incrustation of the evaporation surfaces will take place.

Acting on this further knowledge I have succeeded in constructing a boiler of the type mentioned wherein there is such a methodical circulation that the feed water is first brought to the temperature at which the reactions referred to occur and its circulation or movement toward the evaporation surfaces then made to be so slow that the water will have been maintained at such temperature for a sufficiently long period to insure the reactions being completed and the carbonate and sulfate precipitated to the bottom of the lower drum or cylinder, before the water—now freed from the carbonate and sulfate—is allowed to come into contact with the evaporation surfaces and all this without in any way retarding the necessary active circulation of the water through the evaporation and the return tubes.

A constructional form of my invention whereby such a methodical circulation can be attained is illustrated diagrammatically in the accompanying drawing in sectional perspective view in Figure 1; and Fig. 2 illustrates in sectional elevation one manner of mounting the apparatus whereby heat may be applied to the tubes.

In said drawing the numerals 1 and 2 indicate the upper and lower drums or cylinders respectively, which drums are not exposed to heat and hence are non-heated, and 3, 4 and 5 the evaporation tubes which are heated by the application thereto of heat in any desired or preferred manner. One method of applying heat thereto is shown in Fig. 2 wherein the apparatus is mounted or secured in the smoke stack or chimney 11 of a furnace 12, the heated particles of combustion passing around and between said tubes. The drums 1 and 2 are so located in said furnace as to be exposed very slightly if at all to the heat therein. The central tube, 4, is of larger diameter as it contains within it the return tube 10. As will be seen from the drawing such tubes are provided along the whole length substantially of the drums 1 and 2.

In the upper drum 1 and preferably—though not necessarily—above the intended water level and preferably also extending along the whole length substantially of the said drum, is a trough or equivalent 6 into which the feed water is received from a pipe 7. The trough is arranged so that the feed water is allowed to overflow through slots or the like at a position substantially vertically above the longitudinal axis of the drum or in other words substantially vertically above the central return tubes 10 which latter extend up into the drum 1 some distance beyond the evaporation tubes and at their said upper ends are made with flaring mouths. They also extend downward into the lower drum some distance beyond the evaporation tubes 3, 4 and 5.

Within the lower drum I provide a retarding device which in the example illustrated extends along the whole length of said drum and comprises an inverted V-plate or angle iron 8, carried near to and below the ends of the return tubes 10 and two plates or strips 9 placed at some distance from and slightly lower than the said angle iron 8, the said plates 9 being inclined more or less toward the axis of the drum. Their lower edges are some considerably greater distance apart than the internal diameter of the tubes 10 and they are parallel to each other and to the angle iron 8.

When the boiler is working and the water within it at a high temperature a fairly active circulation takes place through the tubes connecting the two drums, the upward flow being, of course, through the heated evaporation tubes 3, 4 and 5 and the downward flow through the non-heated return tubes 10.

The feed water introduced into the upper drum—which is assumed to be calcareous—is almost instantly brought to a temperature at which the decomposition of the bicarbonate into carbonic acid and carbonate and the precipitation of the sulfate are effected, this practically instantaneous heating of the feed water to such temperature being insured by causing the feed water to be equally distributed along the whole length substantially of the upper drum.

In order to insure that the aforesaid reactions shall be completed and the carbonate and sulfate precipitated in the lower drum before any of the feed water is brought into contact with the evaporation surfaces—i. e., in example illustrated, the evaporation tubes 3, 4 and 5—I provide means for retarding the downward flow of the water after it leaves the tubes 10.

The particular form of retarding means which I illustrate merely by way of example but to which I do not confine myself acts as follows to bring about the methodical circulation for the purpose aforesaid:—

The columns of water from all the return tubes 10 impinge on the angle of the inverted V-shaped bar 8 and are by it divided into two streams which are then made to impinge against the angularly disposed plates 9 to be thereby brought together again into one column the latter having a width determined by the distance apart of the plates 9 and a length equal substantially to the length of the drum, that is to say a column is formed having a very much larger superficial area than the area of the sum of the columns passing down the tubes 10. In consequence of this the water moves at a correspondingly slower speed while traveling from the plates 9 to the bottom of the drum 2 as compared with its speed down the tubes 10, as a result of which the time occupied by the downward movement of the water through the center of the drum 2 and its subsequent upward movement at the sides thereof is amply sufficient to insure the reactions referred to being completed and, further, the speed of movement of the water in the drum 2 is so slow that the carbonate and sulfate are precipitated to the bottom of the drum prior to the water—freed from carbonate and sulfate—reaching the heated evaporation tubes 3, 4 and 5, and all this without interfering with the active circulation of the water through all the tubes.

Although I have shown the means, whereby feed water is introduced into the upper drum, located in the steam space, it may be, if desired, arranged below the level of the water therein so long as the feed water is evenly distributed along the whole length substantially of the upper drum; further, I do not confine myself to the particular means described for supplying such feed water as instead of the trough 6 I may for example provide a perforated pipe. Nor do I confine myself to the particular arrangement or number shown of the tubes connecting the two drums.

What I claim as my invention and desire to secure by Letters Patent is:—

1. In a steam generator comprising superposed drums and heated evaporation tubes and non-heated return tubes connecting them, means located within the lower drum whereby each rapidly downward flowing column of water as this enters the lower drum is converted into a slowly moving column whose direction of flow toward the bottom of the drum is maintained, all for the purposes set forth.

2. In a steam generator comprising superposed drums and heated evaporation tubes and non-heated return tubes connecting them, means located in the lower drum and just below said return tubes for spreading out the descending columns of water as these enter the lower drum while insuring the maintenance of the direction of downward flow to the bottom of the lower drum, for the purposes set forth.

3. In a steam generator comprising superposed drums and heated evaporation tubes and non-heated return tubes connecting them, means, located in the lower drum, whereby the downward flow of the water from the top to the bottom of the lower drum is maintained or insured but the speed of movement of the water in said drum is made to be much slower than during its descent in the return tubes, for the purposes set forth.

4. A steam generator comprising superposed drums, heated evaporation tubes and non-heated return tubes connecting said drums, means located in the lower drum to divide the columns of water as these enter the drum and means for thereafter insuring the downward movement of said divided column, all for the purposes set forth.

5. A steam generator comprising superposed drums, heated evaporation tubes and non-heated return tubes connecting said drums, and a retarding and guiding means comprising an inverted V-shaped bar or plate located in the lower drum at a position vertically below and near to the return tubes, and angularly disposed plates located on each side of and at some distance from the V plates and tilted so that their lower edges are closer together than their upper edges all for the purposes set forth.

In testimony whereof I have signed my name to this specification in the presence of two subscribing witnesses.

PAUL KESTNER.

Witnesses:
J. LELEU,
PE ORT.

Copies of this patent may be obtained for five cents each, by addressing the "Commissioner of Patents, Washington, D. C."